United States Patent
Frazier et al.

[15] 3,650,613
[45] Mar. 21, 1972

[54] TELETYPEWRITER OPAQUE OPTICAL PROJECTOR AND THE LIKE

[72] Inventors: Francis Frazier, Cambridge, Mass.; Ralph P. Graeber, Woodland Hills, Calif.

[73] Assignee: Bolt Beranek and Newman, Inc., Cambridge, Mass.

[22] Filed: Feb. 25, 1969

[21] Appl. No.: 802,116

[52] U.S. Cl. ............................................................. 353/46
[51] Int. Cl. ......................................................... G03b 21/00
[58] Field of Search ...................... 353/77, 78, 98, 99, 65, 66, 353/46, 50, 51

[56] References Cited

UNITED STATES PATENTS

| | | |
|---|---|---|
| 1,081,922 | 12/1913 | Balderston ................................ 353/51 |
| 1,959,038 | 5/1954 | Ridgway ................................... 353/65 |
| 2,505,505 | 4/1950 | Sachtleben ............................... 353/78 |
| 2,543,561 | 2/1951 | Tracy ........................................ 353/78 |
| 2,699,704 | 1/1955 | Fitzgerald ................................ 353/99 |
| 3,104,587 | 9/1963 | Meyerhoefer ........................... 353/51 |
| 3,224,325 | 12/1965 | Quaas ....................................... 353/97 |
| 3,489,494 | 1/1970 | Snider ...................................... 353/78 |

*Primary Examiner*—Leonard Forman
*Assistant Examiner*—A. J. Mirabito
*Attorney*—Rines & Rines

[57] ABSTRACT

This disclosure deals with an opaque optical projector that is adapted for attachment to real-time data-recording objects, for simultaneous projection of the data thereof without interference with the operation of the recording.

9 Claims, 1 Drawing Figure

Patented March 21, 1972 3,650,613
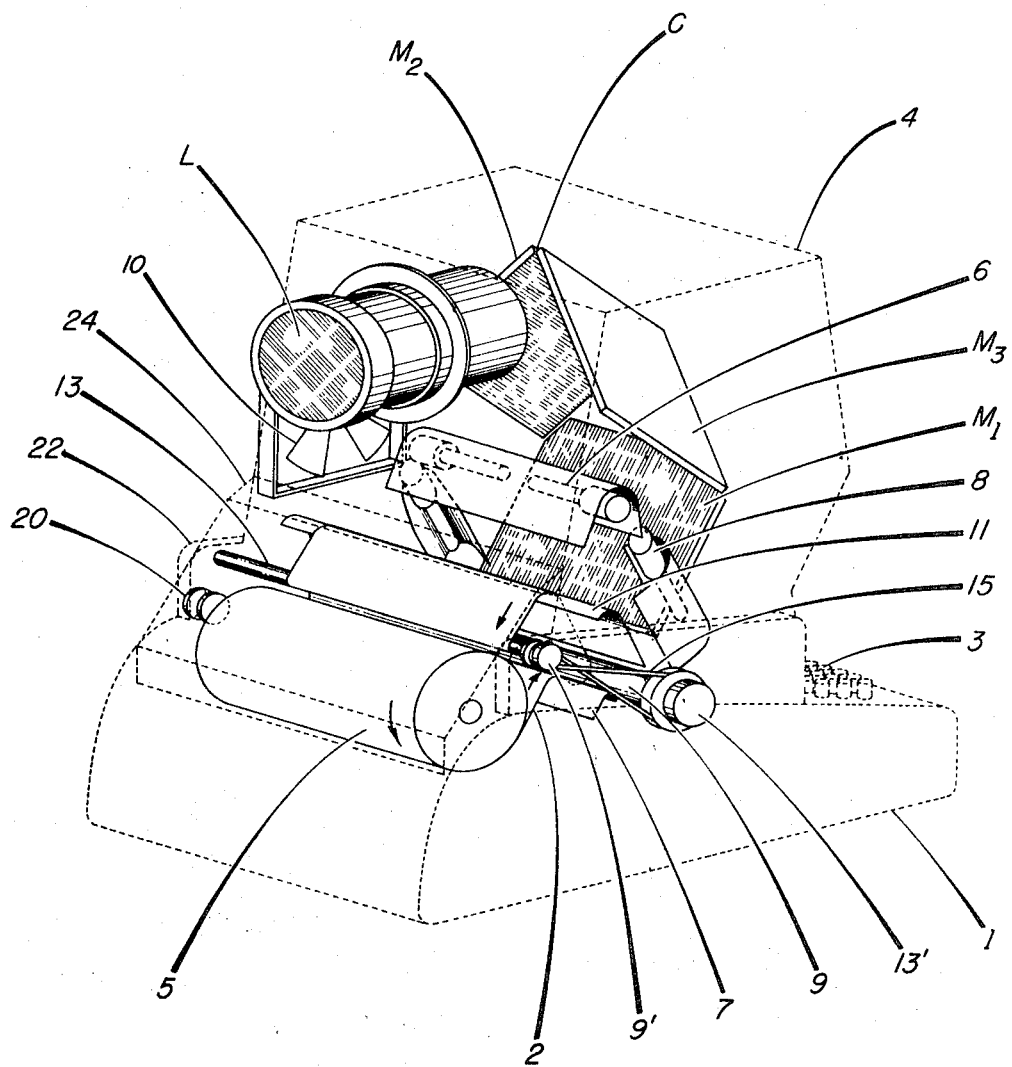
FRANCIS FRAZIER
RALPH P. GRAEBER, INVENTORS
BY Rines and Rines
ATTORNEYS

TELETYPEWRITER OPAQUE OPTICAL PROJECTOR AND THE LIKE

The present invention relates to optical projectors and the like, being more particularly directed to such projectors of the opaque type.

For a century or more, proposals have been made and apparatus constructed for optically projecting time-changing records of various types, including films and other objects of relatively small size, into relatively large-area presentations that may be viewed by large groups of persons. Inherent in such systems have been the problems created by heat of illumination of the record or other object, proper orientation of the projected image, the size and bulk of the projecting apparatus and the ease of adjustment in operation, including the optical system thereof.

In the more modern age, however, the problem of making visible to large groups [as for purposes of teaching, monitoring, consultation and the like] real time-changing recording information, such as is produced line by line in teletypewriter recording apparatus and the like, involves difficult and peculiar problems that, unfortunately, cannot adequately be solved by such prior projector techniques. Among such problems, are the facile attachment and removal to and from operating machinery, the illumination of curved paper surfaces and lines or regions thereof partially concealed by the printing apparatus as it is recording on the paper, the peculiar heating and cooling difficulties attendant upon adequate uniform illumination of such an object, the unique problems of projecting a properly oriented and elevated image from the rigidly fixed orientation and location of copy being printed, and the provision of facile optical and other adjustments without interfering with the normal high-speed operation of the teletypewriter or other similar recording device.

It is to the solution of these problems that the present invention is primarily directed, it being an object of the invention to provide a new and improved optical projector of the opaque type that is particularly suited for attachment to operating recording apparatus such as teletypewriters and the like. In summary, this end is achieved by means of a plurality of properly oriented image inverting and correcting mirror and lens systems operating with an illumination system that reflects images thereto from a reflecting surface over which the data-to-be-projected is passed.

A further object is to provide a novel optical projector of more general utility, as well.

Other and further objects will be explained hereinafter and are more particularly pointed out in the appended claims.

The invention will now be described with reference to the accompanying drawing, the single FIGURE of which is an isometric view, partly cut away, illustrating a preferred embodiment of the invention, and shown for illustrative purposes as attached to teletypewriter or similar recording apparatus, all hereinafter generically referred to as teletypewriter apparatus and the like.

Referring to the drawing, such a teletypewriter or the like, is shown at 1, receiving on the upper portion thereof above the keyboard 3, a housing containing the opaque projection apparatus of the invention. Paper 2, preferably white, is supplied from a roll 5, and is carried over the normal teletypewriter paper-tensioner surface 7, as shown, and thence under and around the typewriter platen 9, and over the upwardly inclining paper guide plate surface 11, where the previously printed or recorded lines appear in successively upwardly displaced lines or regions of the paper on the guide plate surface 11, with the current real-time printed data in the lowermost line or region adjacent the conventional printing elements [not shown]. The paper is then passed to the tensioned paper roller 13; torque for which is provided from the teletypewriter platen. The normal platen knob is removed and replaced with pulley 13', and spring belt 15 is mounted between pulley 13' and pulley 9' to transmit torque to take up roller 13. Alternately, other means can be used to hold the moving paper flat on plate 11 for lens focusing.

Paper is passed from the conventional paper feed mechanism, through the printing mechanism, across the preferably bright finished guide plate, and out of the projector housing in a manner that does not permit of cooling airflow restrictions that would otherwise cause difficulties under the peculiar heating conditions involved in illumination of the paper by relatively closely spaced high-intensity lamps. These lamps are shown at 6 and 8, provided with reflectors, and mounted in front of and peripherally above and to the sides of the inclined plate surface 11 that carries the section of the recorded paper that is to be projected. Cooling fans are disposed at the sides of the housing 4, as at 10, to provide the cooling airflow so essential to prevent discoloring charring, or other overheating of the paper and other parts enclosed by the light-tight housing 4.

In accordance with the optical requirements of the system, three prismatically arranged mirrors are provided; M1, M2, and M3. The mirror M1 is forward of the illuminated copy at surface 11, and reflects the image therefrom substantially vertically upward, being tilted at about 45° to the vertical, such that the inclined plate 11 and inclined mirror M1 diverge from each other and on opposite sides of the vertical. The mirror reflecting surfaces M2 and M3 disposed thereabove are oriented at a precise angle of 90° with their planes of intersection forming line C.

In the preferred embodiment of the invention, the required left-to-right inversion of the optical image prior to projection is achieved within space limitations imposed by other optical considerations by use of a precise 90° angle between the planes of M2 and M3. The required top-to-bottom inversion of the optical image, plus optical elevation of the projected image, is achieved within space limitations by the angle of 90° to 120° between line C and the plane of mirror M1. The exact angles between line C and M1, and between M1 and surface 11 are selected to provide both optical elevation of the front projected image and uniform top-to-bottom focus of the projected image.

The focusing lens L inverts the image again [both left-to-right and top-to-bottom] so that a properly inverted and elevated image is projected most conveniently to the front of the apparatus in the direction faced by the teletypewriter operator. Additionally, the separation at the rear of M2 and M3 provides clearance whereby the operator seated in the normal position at the teletypewriter keyboard can directly view the typed copy on surface 11 with light directed thereon, which may be attenuated, if desired.

In an alternate embodiment of the invention, the orthogonal mirrors M2 and M3 could be replaced by a mirror orientated along the angle of the line C which would reflect the vertically upward reflected image from mirror M1 to a third mirror external to and outside the lens L and oriented at an angle to the axis of lens L. This embodiment of the invention is less desirable since the image cannot conveniently be elevated either by optical or mechanical means and is projected to the side of the operator.

In the preferred embodiment of the invention, the optical elements [surface 11, M1, M2, M3, and lens L] are attached to housing 4, Bearings fitted between side flanges 22 and housing 4 allow housing 4 to be rotated around the centerline of platen 9 to provide mechanical change of image elevation. Adjusting screw 20 locks housing 4, by friction, to base plates 22 when the desired image elevation angle has been established.

In order to maintain the substantially light-tight character of the projection system, a pivotally adjustable light shield 24 is provided, hinged below the lens L to rest against and cover the paper supply roll, and prevent light leakage at that region.

In a typical successful projector of this type, using 6000 lumen quartz envelope bulbs, projection of 20 lines of typed copy, including the line being typed, has been effected up to 20 feet from the apparatus, for viewing by sizable groups.

Further modifications will occur to those skilled in the art and all such are considered to fall within the spirit and scope of this invention as defined in the appended claims.

What is claimed is:

1. An opaque optical projector for attachment to teletypewriter apparatus and the like, having, in combination, a substantially light-tight projector housing provided with means for mounting the same upon said apparatus and covering a reflecting surface associated with said apparatus over which the data-to-be-projected is passed, reflector means adjacent to said reflecting surface for reflecting the image of said data upwardly therefrom, said reflector means and said surface being oppositely inclined and forming a substantial angle therebetween, illuminating means disposed around the periphery of said surface and illuminating means being disposed within said angle for illuminating said surface, and further reflector and lens means disposed upward of said reflector means and adjusted to receive the reflection therefrom and in turn to reflect and project an ultimately upright image of said data external to said housing.

2. An opaque optical projector as claimed in claim 1 and in which further reflector means comprise a pair of substantially 90° intersecting reflector disposed above the first-named reflector means with their line of intersection making an angle of 90° to 120° with the plane of the first-named reflector means.

3. An opaque optical projector as claimed in claim 1 in which means are provided to tilt the housing and thereby raise and lower the projected image.

4. An opaque optical projector as claimed in claim 3 and in which there is further provided sheet feed assembly means for continually passing a sheet containing data over said reflecting surface between a supply and drive roll, means for tensioning said sheet in the region of said reflecting surface, and means for passing cooling air through said housing and sheet feed assembly means during the operation of said illumination means.

5. An opaque optical projector as claimed in claim 4 and in which adjustable shield means is provided for rendering the sheet feed assembly means substantially light-tight.

6. An opaque optical projector as claimed in claim 1 and in which the housing is provided with means for enabling viewing of the data.

7. An opaque optical projector as claimed in claim 1 and in which means is provided for passing a sheet of paper from the paper supply means, through the writer means of the teletypewriter apparatus, over and flat against said reflecting surface and out of said housing; and there is further provided means for cooling said paper, writer means, and illumination means during operation of said writer.

8. An opaque optical projector as claimed in claim 1 and in which the first-named reflector means, the further reflector means, and the lens means are arranged in the foregoing sequence along an optical path extending away from said reflecting surface, one of the reflector means being a substantially uniplanar mirror and the other reflector means being a pair of intersecting reflectors spaced from the said one reflector means.

9. An opaque optical projector as claimed in claim 8 and in which said housing is provided with means for viewing said data through the space between said reflector means.

* * * * *